United States Patent
Chan et al.

(10) Patent No.: US 7,020,392 B2
(45) Date of Patent: Mar. 28, 2006

(54) FINDER HOUSING

(75) Inventors: Raymond Chan, Kowloon (CN); Yiu Hung Li, Kowloon (CN); Nobuaki Higashi, Tokyo (JP); Mikihiko Kato, Tokyo (JP)

(73) Assignees: IDT Data System Limited, Hong Kong (CN); Fuji Film Axia Co., Ltd, Tokyo (JP); Fuji Photo Film Co., Ltd., Kanagawa (JP)

( * ) Notice: Subject to any disclaimer, the term of this patent is extended or adjusted under 35 U.S.C. 154(b) by 117 days.

(21) Appl. No.: 10/829,293

(22) Filed: Apr. 22, 2004

(65) Prior Publication Data

US 2004/0240876 A1 Dec. 2, 2004

(30) Foreign Application Priority Data

Apr. 23, 2003 (JP) .............................. 2003-118189

(51) Int. Cl.
*G03B 13/06* (2006.01)
(52) U.S. Cl. ....................................................... 396/382
(58) Field of Classification Search ................ 396/373, 396/382; 348/341; 359/643, 646
See application file for complete search history.

(56) References Cited

U.S. PATENT DOCUMENTS

| | | | | |
|---|---|---|---|---|
| 3,377,911 A | * | 4/1968 | Mische et al. | 396/373 |
| 3,393,623 A | * | 7/1968 | Gutmann et al. | 396/377 |
| 4,279,488 A | * | 7/1981 | Hines | 396/176 |
| 5,899,583 A | * | 5/1999 | Alligood | 396/6 |
| 6,256,063 B1 | | 7/2001 | Saito et al. | 348/231.99 |
| 6,397,004 B1 | * | 5/2002 | Kameyama et al. | 396/6 |
| 6,525,767 B1 | | 2/2003 | Saito et al. | 348/231.7 |

FOREIGN PATENT DOCUMENTS

JP 10-248029 A 9/1998

\* cited by examiner

*Primary Examiner*—W. B. Perkey
(74) *Attorney, Agent, or Firm*—Birch,Stewart,Kolasch & Birch,LLP (57) ABSTRACT

An objective that is a concave lens and an ocular that is a convex lens are arranged in a finder housing with a predetermined space between them. The finder housing is molded of a black plastic material. A diaphragm portion is integrally formed inside an inner peripheral portion of the finder housing and between the objective and the ocular. The diaphragm portion is formed to be as large as a lens portion of the ocular. The diaphragm portion serves to block unwanted reflected light.

8 Claims, 8 Drawing Sheets

FINDER HOUSING

BACKGROUND OF THE INVENTION

This Non-provisional application claims priority under 35 U.S.C. § 119(a) on Patent Application No(s). 2003-118189 filed in JAPAN on Apr. 23, 2003, the entire contents of which are hereby incorporated by reference.

1. Field of the Invention

The present invention relates to a finder housing, and in particular, to a finder housing incorporated into a card type digital camera.

2. Description of the Related Art

Digital cameras classified into a category called toy cameras have a camera body molded of plastics and a transparent finder in order to reduce manufacturing costs as much as possible (refer to, for example, Japanese Patent Application Publication No. 10-248029).

However, the transparent finder does not provide a clear finder image. Accordingly, some of these cameras use an optical finder of an inverted Galilean type which comprises an objective that is a concave lens and an ocular that is a convex lens.

However, with an inverted Galilean type optical finder, when bright light such as sunlight enters a finder optical path, it is irregularly reflected by the inner wall surface of the finder. Then disadvantageously, the resulting finder image is difficult to see.

SUMMARY OF THE INVENTION

The present invention is provided in view of these circumstances. It is an object of the present invention to provide a finder housing that provides a clear finder image.

To accomplish this object, the present invention provides a finder housing in which an objective that is a concave lens and an ocular that is a convex lens are arranged on an optical axis of an objective and an ocular with a predetermined spacing between an objective and an ocular, the finder housing being located at a predetermined position in a camera main body, the finder housing comprising a positioning concave portion formed like a frame surrounding the objective and ocular and having inner peripheral portions into which positioning convex portion formed on outer peripheries of a lens portion of the objective and a lens portion of the ocular is fitted, and a diaphragm portion which blocks reflected light from an outer peripheral surface of the objective and which is integrally formed between the objective and the ocular and which is formed so as to be dividable in a vertical or lateral direction.

According to the present invention, the diaphragm portion is integrally formed in the finder housing. Accordingly, even if light incident on the objective lens is irregularly reflected by the outer peripheral surface of the objective, the diaphragm portion can block the unwanted irregularly reflected light to provide a clear finder image.

In the present invention, an objective and an ocular are on the same optical axis.

In the present invention, a flange portion may be formed around an outer periphery of a rear end of the lens portion of the objective, and the positioning convex portion may be formed on an outer periphery of the flange portion. A flange portion may be formed around an outer periphery of a front end portion of the lens portion of the ocular, and the positioning convex portion may be formed on an outer periphery of the flange portion. The camera main body may comprise a front frame and a rear frame. The finder housing may be formed like a frame surrounding the outer peripheries of the flange portions of the objective and ocular, arranged with the predetermined spacing between them. The finder housing may be located at the predetermined position in the camera main body by fitting the lens portion of the objective into an opening formed in the front frame and fitting the lens portion of the objective in an opening in the rear frame.

In the present invention, "a front end" is an object side end of an objective and an ocular, and "a rear end" is an opposite side.

According to this aspect, the camera main body comprises the front frame and the rear frame. The finder housing can be located at the predetermined position in the camera main body by fitting the lens portion of the objective into the opening formed in the front frame and fitting the lens portion of the objective in the opening in the rear frame.

Furthermore, according to the present invention, the camera main body may be formed of a plastic material in a bright color, while the finder housing may be formed of a plastic material in a dark color.

According to this aspect, light from the surroundings can be prevented from entering the finder housing by forming the finder housing using a plastic material in a dark color such as black. Furthermore, according to this aspect, the camera main body can be formed using plastic in a bright color such as white.

Moreover, in the present invention, an opening in the diaphragm portion may be formed to be as large as the lens portion of the ocular.

According to this aspect, by forming the opening in the diaphragm portion to be as large as the lens portion of the ocular, it is possible to effectively eliminate eye-hazardous light without impairing the visual field of the finder.

As described above, according to the present invention, the diaphragm portion is integrally formed in the finder housing. Accordingly, even if incident light is irregularly reflected by the outer peripheral surface of the objective, the diaphragm portion can be used to block unwanted light to provide a clear finder image. Furthermore, by forming the finder housing using black plastic, it is possible to prevent light from the surroundings from entering the finder.

DETAILED DESCRIPTION OF THE PREFERRED EMBODIMENTS

With the accompanying drawings, description will be given below of a preferred embodiment of a finder housing according to the present invention.

Figure 1:
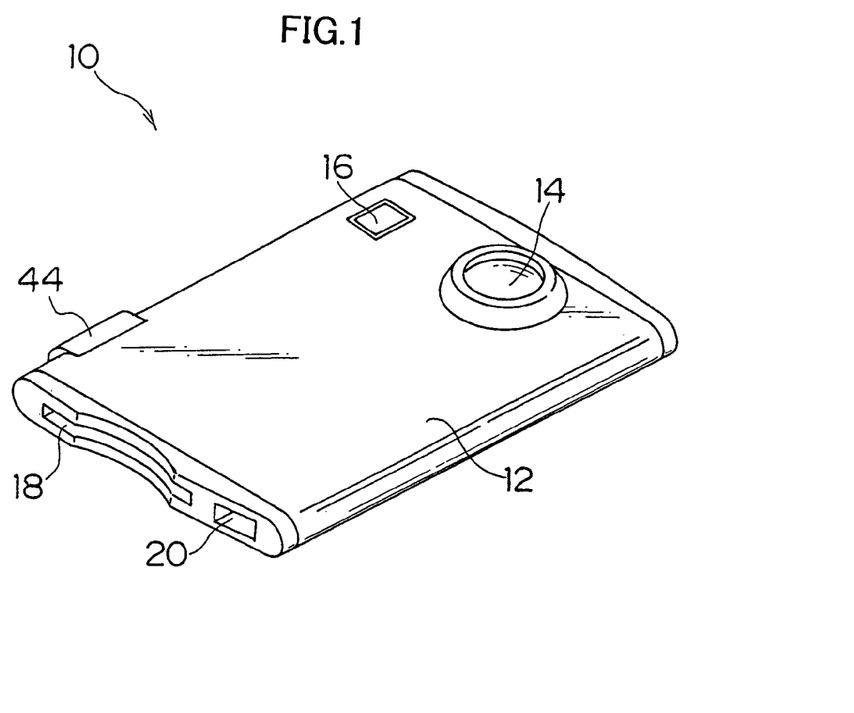
FIG. 1 is a front perspective view of a digital camera into which a finder housing according to the present invention is incorporated.
Figure 2:
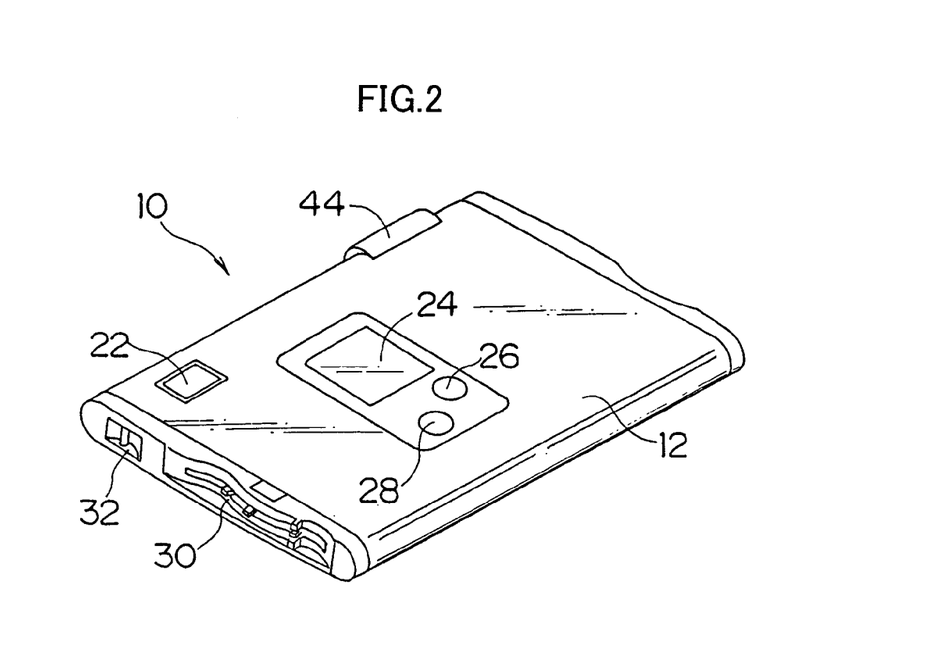
FIG. 2 is a rear perspective view of the digital camera into which the finder housing according to the present invention is incorporated.

FIGS. 1 and 2 are a front perspective view and a rear perspective view of a digital camera into which the finder housing according to the present invention is incorporated.

As shown in these figures, a digital camera 10 is of a card type having only a photographing function. A camera main body 12 is dimensioned like a business card and has a thickness of about 8 mm.

A photographing lens 14 and a finder window 16 are provided on a front surface of the camera main body 12 as shown in FIG. 1.

The photographing lens 14 comprises a collapsible single-focus lens. The photographing lens 14 is extended to a "photographing position" and a "macro photographing position" in unison with a rotating operation of a mode dial 30, described later.

A card slot 18 and a USB terminal 20 are provided on a left side (in the left of FIG. 1) of the camera main body 12.

A memory card is removably installed in the card slot 18. A photographed image is recorded in a memory card installed in the card slot 18. The digital camera 10 also has a built-in memory. If no memory card is installed in the card slot 18, images are recorded in the built-in memory.

A USB cable is connected to the USB terminal 20 so that image data recorded in the memory card or built-in memory can be loaded into a personal computer or the like via the USB cable.

As shown in FIG. 2, a finder ocular portion 22, a liquid crystal display portion 24, an image quality switch/image deletion button 26, and a beep ON/OFF button 28 are provided on a rear surface of the camera main body 12.

The liquid crystal portion 26 is composed of monochromatic character liquid crystal to display the remaining number of photographs that can be taken, photographing image quality, the quantity of charges in batteries, the presence or absence of a beep, and the like. The image quality switch/image deletion button 26 functions to instruct on the switching of photographing image quality (640×480 pixels/320×240 pixels) and the deletion of a photographed image. The beep ON/OFF button 28 functions to instruct a beep to be turned on or off.

A mode dial 30 also used as a power switch and a strap attaching portion 32 are provided on a right side (in the left of FIG. 2) of the camera main body 12.

The mode dial 30 can be rotatively moved around an optical axis of the photographing lens 14 between an "OFF position" and an "ON position" and a "macro position". The digital camera 10 is powered off by placing the mode dial 30 in the "OFF position". Then, by rotating the mode dial 30 from the "OFF position" to the "ON position", the power supply is turned on. Furthermore, the photographing lens 14 is extended to the "photographing position" to enable photographing. Moreover, by rotating the mode dial 30 from the "ON position" to the "macro position", the photographing lens 14 is extended to the "macro photographing position" to enable macro photography.

Figure 3:
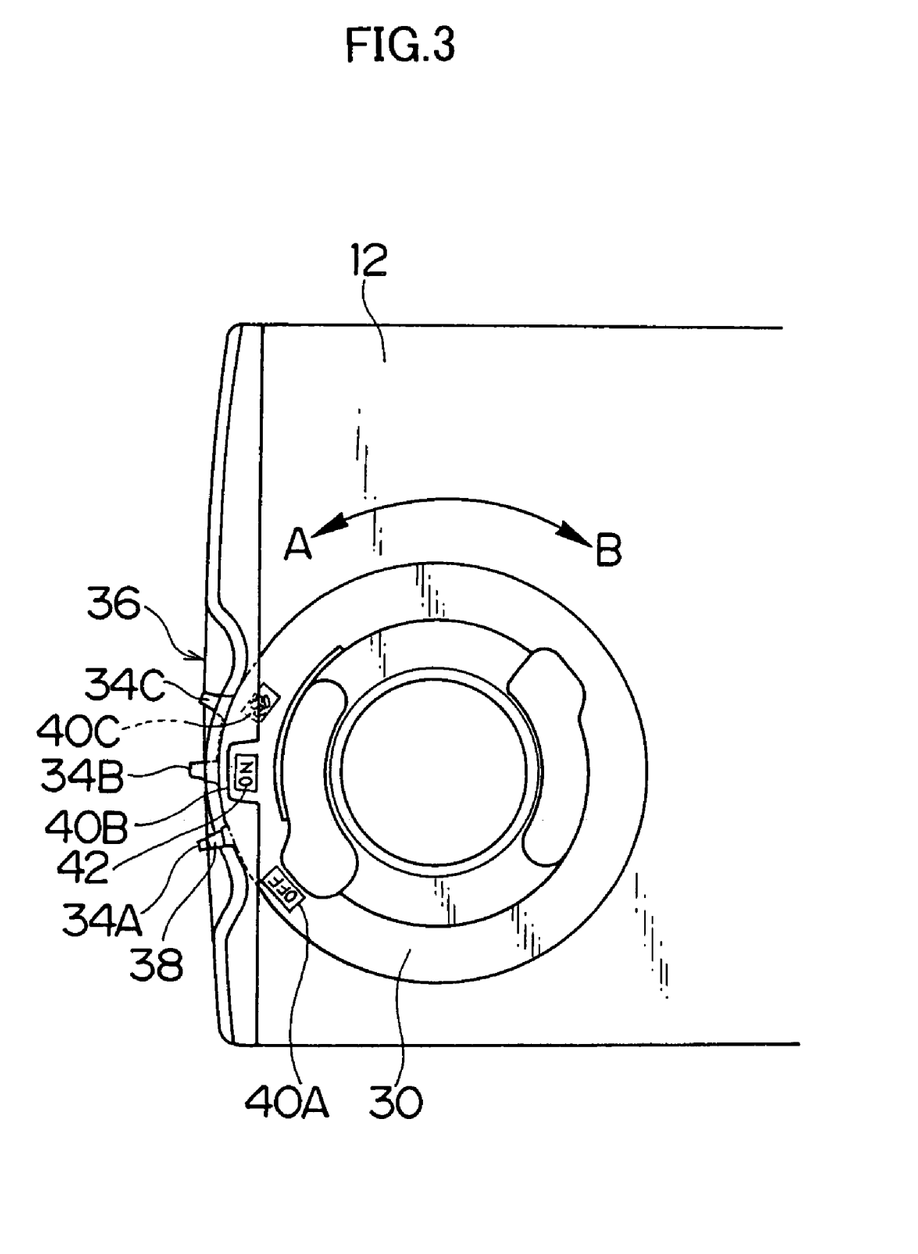
FIG. 3 is a rear view showing the configuration of a mode dial.
Figure 4:
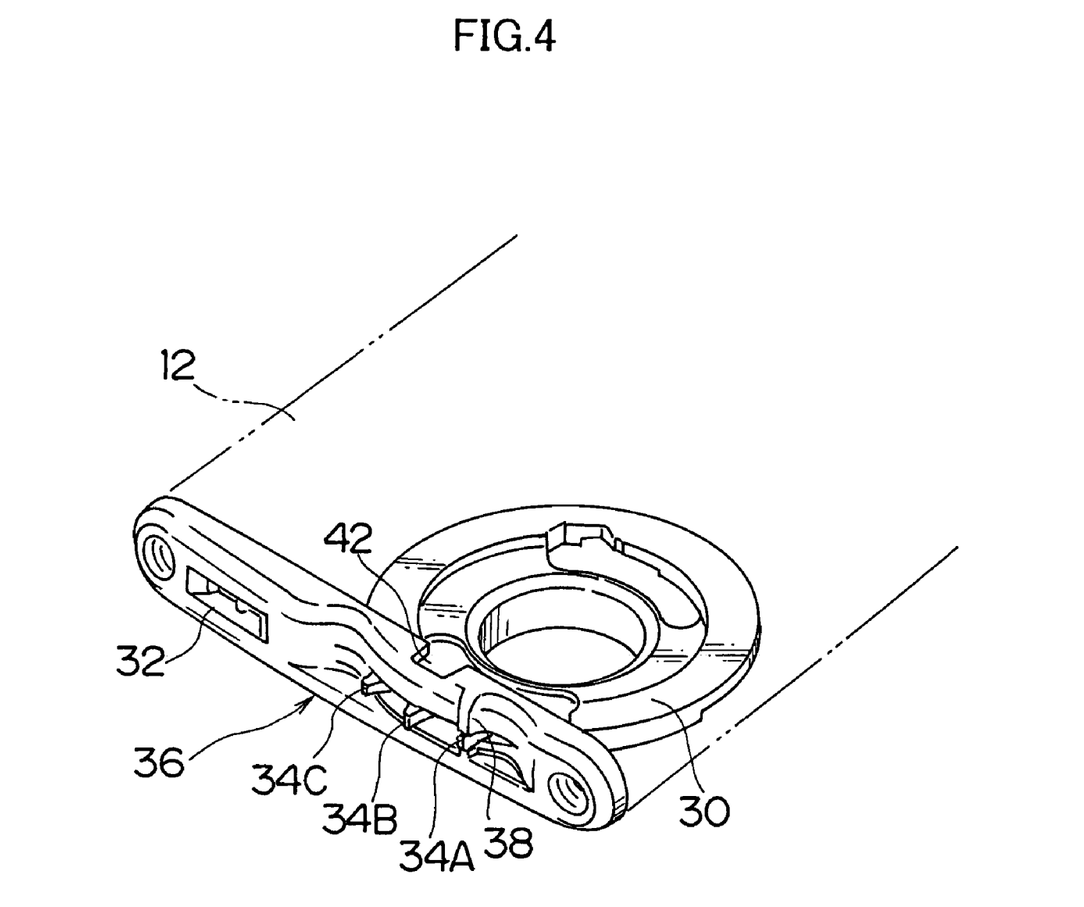
FIG. 4 is a perspective view showing the configuration of the mode dial.

As shown in FIGS. 3 and 4, three pawls 34A, 34B, and 34C are disposed on the outer periphery of the mode dial 30 at predetermined intervals. The mode dial 30 is rotated by placing the nails of the fingers on the pawls 34A, 34B, and 34C.

Furthermore, an arc guide portion 36 is formed on a right side (in the left of FIG. 2) along the outer periphery of the mode dial 30. To rotate the mode dial 30, the nails of the fingers are placed on the pawls 34A, 34B, and 34C to rotate the dial 30 so as to trace the arc surface of the guide portion 36.

Moreover, a stopper 38 extrusively formed on the arc surface of the guide portion 36. When the nails of the fingers are placed on the pawls 34A and 34B to rotate the mode dial 30, the nails are caught at predetermined positions to stop the rotation of the mode dial 30.

The nail of the finger is placed on the first pawl 34A to rotate the mode dial 30 in a direction A in FIG. 3. Then, the nail is caught on the stopper 38 at a predetermined position to stop the rotation of the mode dial 30. At this time, the first pawl 34A overlaps the stopper 38 to place the mode dial 30 in the "ON position".

Then, the nail of finger is placed on the second pawl 34B to rotate the mode dial 30 placed in the "ON position", in the direction A in FIG. 3. Then, the nail is caught on the stopper 38 at a predetermined position to stop the rotation of the mode dial 30. At this time, the second pawl 34B overlaps the stopper 38 to place the mode dial 30 in the "macro position".

Then, the nail of finger is placed on the third pawl 34C to rotate the mode dial 30 placed in the "macro position", in a direction B in FIG. 3. Then, the mode dial 30 is placed in the "ON position". Subsequently, the nail of finger is placed on the second pawl 34B to rotate the mode dial 30 in a direction B in FIG. 3. Then, the mode dial 30 is placed in the "OFF position". Once the mode dial 30 is placed in the "OFF position", the power supply of the camera is turned off, with only the first pawl 34A exposed from the guide portion 36.

By thus placing the nails of the fingers on the three pawls 34A, 34B, and 34C, formed on the outer peripheral portion of the mode dial 30, it is possible to rotate the mode dial between the "OFF position" and the "ON position" and the "macro position".

Furthermore, when the mode dial 30 is in the "OFF position", an icon 40A of an "OFF" mark on the rear surface of the mode dial 30 is located under a window 42 formed in the rear surface of the camera main body 12. The photographer can check the display in the window 42 to confirm that the camera is now off.

Similarly, when the mode dial 30 is in the "ON position", an icon 40B of an "ON" mark on the rear surface of the mode dial 30 is located under the window 42, formed in the rear surface of the camera main body 12. When the mode dial 30 is in the "macro position", an icon 40C of a "macro" mark (a tulip mark) on the rear surface of the mode dial 30 is located under the window 42, formed in the rear surface of the camera main body 12. A photographer can check the display in the window 42 to confirm that the camera is now in an ON state or in a macro photographing state.

As shown in FIGS. 1 and 2, a release button 44 is provided on the top surface of the camera main body 12. Pushing the release button 44 allows an image to be recorded in the built-in memory or memory card.

Figure 5:
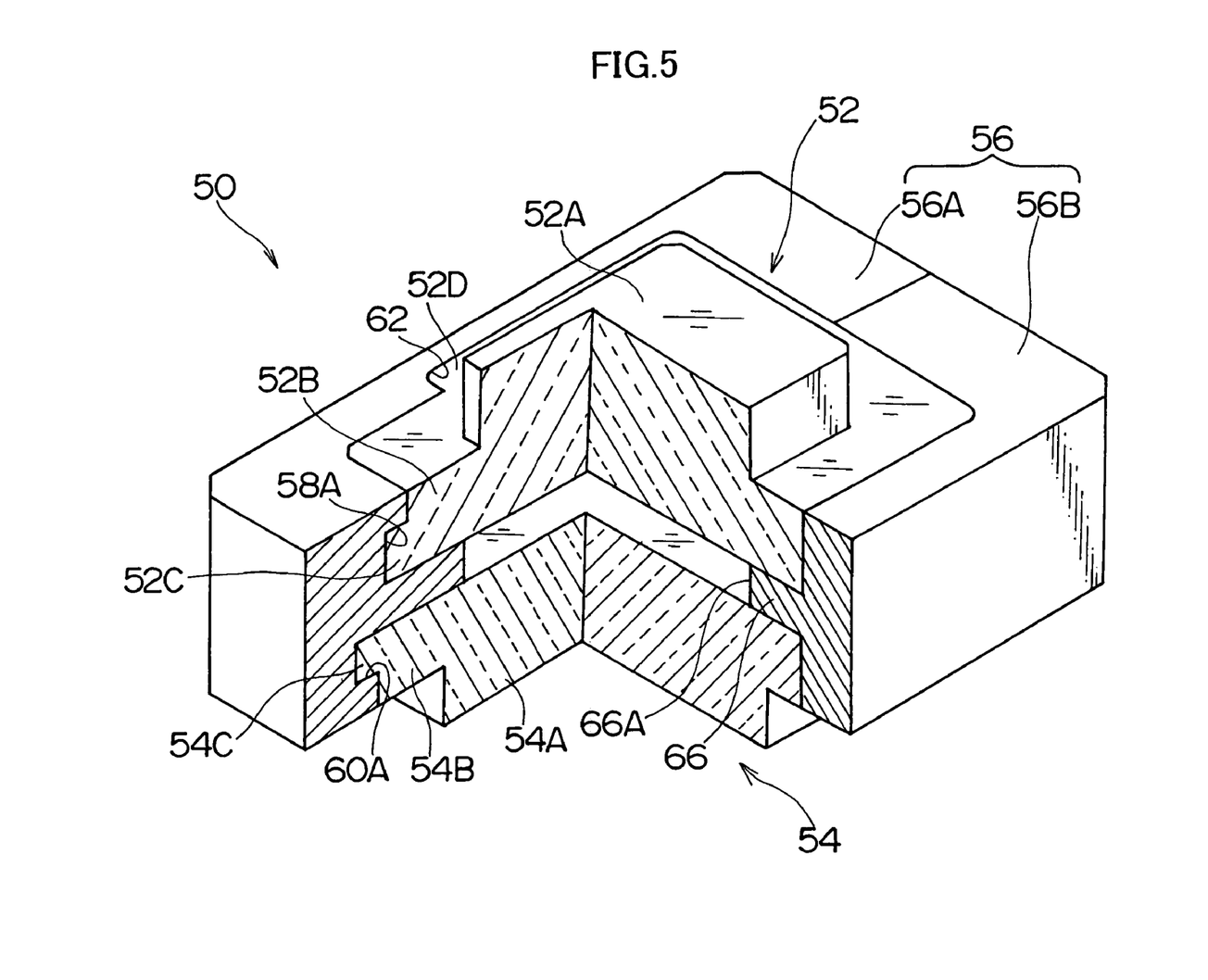
FIG. 5 is a perspective view showing the configuration of a finder housing.
Figure 6:
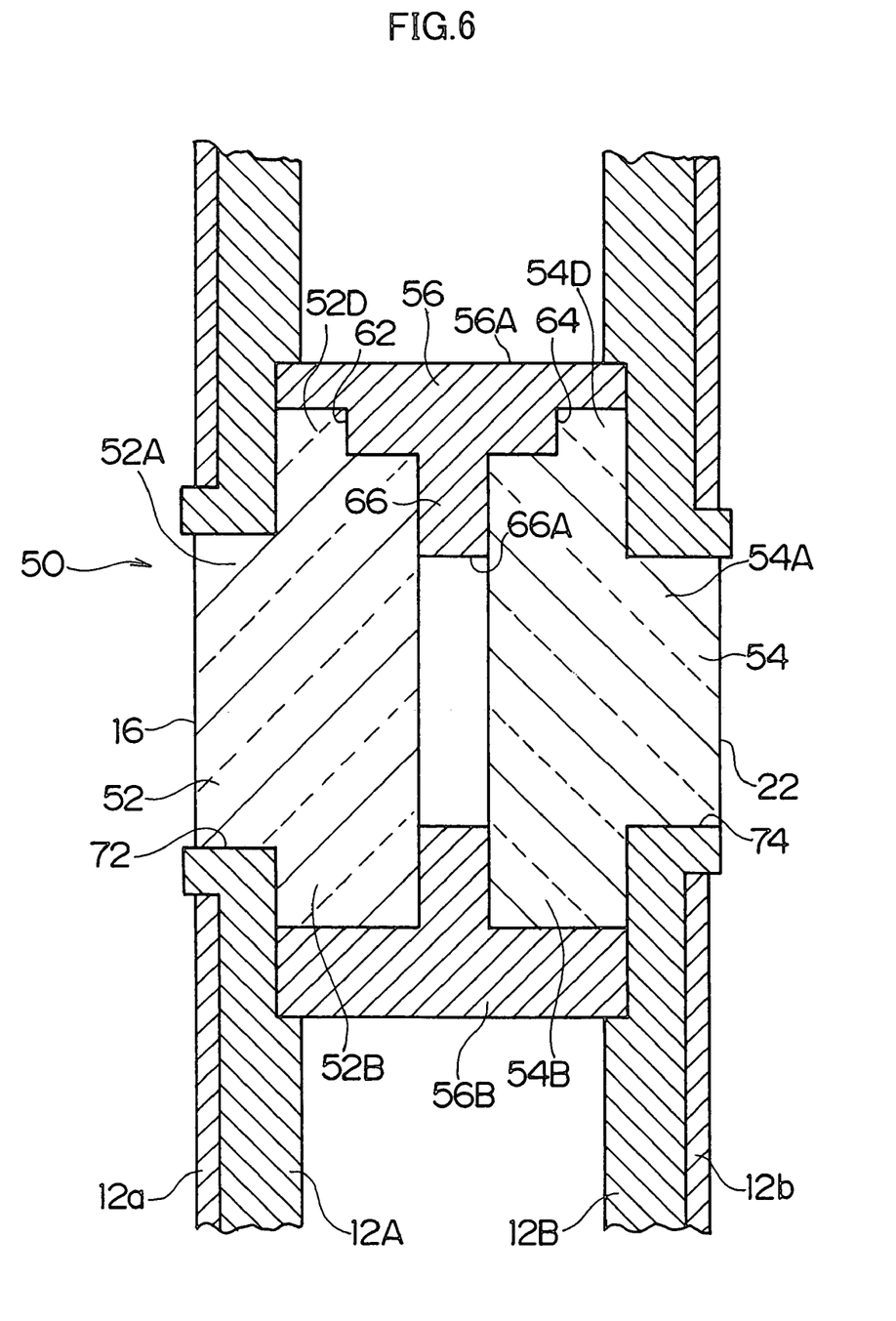
FIG. 6 is a side sectional view showing the configuration of the finder housing.
Figure 7:
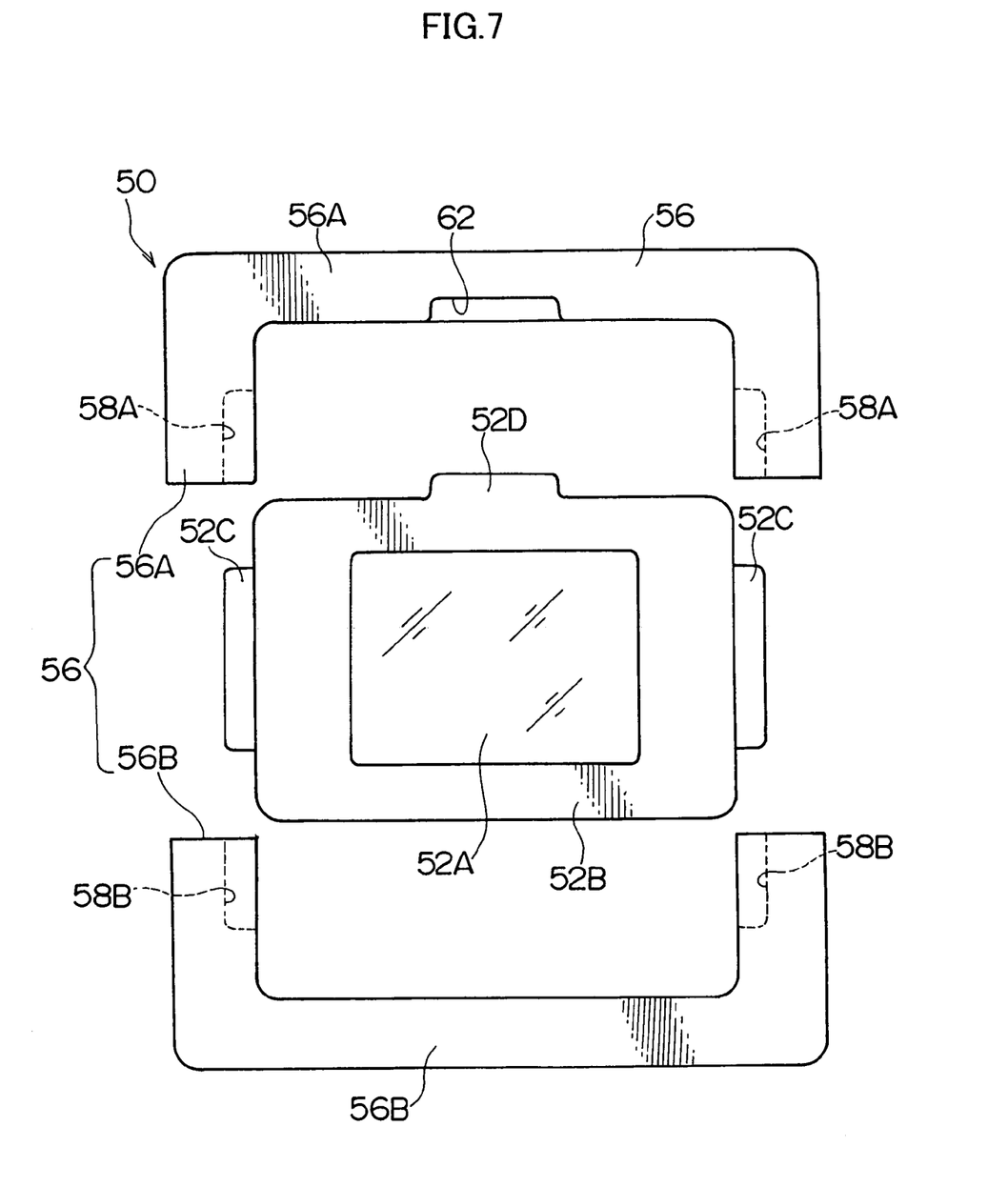
FIG. 7 is a diagram showing how the finder housing is assembled.

FIGS. 5 and 6 are a perspective view and a side sectional view, respectively, showing the configuration of the finder. FIG. 7 is a diagram showing the configuration of the finder and how it is assembled.

As shown in these figures, the finder is of an inverted Galilean type including an objective 52 that is a concave lens and an ocular 54 that is a convex lens. In this finder, the objective 52 and the ocular 54 are accommodated in a finder housing 56 as a unit. That is, the finder is configured as a finder unit 50 separate from the camera main body 12.

The objective 52 is formed to be rectangular and has a rectangular lens portion 52A and a rectangular flange portion 52B integrally molded around the outer periphery of a rear end portion of the lens portion 52A.

Likewise, the ocular 54 is formed to be rectangular and has a rectangular lens portion 54A and a rectangular flange portion 54B integrally molded around the outer periphery of a front end portion of the lens portion 54A.

The flange portion 52B of the objective 52 and the flange portion 54B of the ocular 54 are formed to have the same size. The finder housing 56 is formed to surround the outer peripheries of the flange portions 52B and 54B of the objective 52 and ocular 54. Specifically, an inner peripheral portion of the finder housing 56 is formed to be the same rectangle as that constituted by the flange portions 52B and 54B of the objective 52 and ocular 54. The finder housing 56 is formed generally like a rectangular frame. The finder housing 56 is formed of a plastic material in a dark color, for example, black so as to be dividable in a vertical direction (or lateral direction).

An upper housing 56A and a lower housing 56B into which the finder housing 56 is divided have positioning concave portions 58A, 58B, 60A, and 60B formed in the opposite sides of the inner peripheral portions of the housings (the positioning concave portion 60B, formed in the lower housing 56B, is not shown). Positioning convex portions 52C and 54C formed in the opposite sides of the flange portions 52B and 54B of the objective 52 and ocular 54 are fitted into the positioning concave portions 58A, 58B, 60A, and 60B, respectively. Thus, the objective 52 and the ocular 54 are located at predetermined positions in the finder housing 56.

Concave portions 62 and 64 are formed in the top surface of the inner peripheral portion of the upper housing 56A. Accordingly, projections 52D and 54D formed on the top surfaces of the flange portions 52B and 54B of the objective 52 and the ocular 54 can be fitted into the concave portions 62 and 64, respectively.

Moreover, a diaphragm portion 66 is integrally formed around the inner peripheral portion of the finder housing 56. Accordingly, the diaphragm portion 66 is formed to lie between the objective 52 and the ocular 54 when the objective 52 and the ocular 54 are mounted on the finder housing 56. An opening 66A in the diaphragm portion 66 is formed to have the same size as that of the lens portion 54A of the ocular 54.

To mount the objective 52 and the ocular 54 in the finder housing 56, the positioning convex portions 52C and 54C, formed on the opposite sides of the flange portions 52B and 54B, are fitted into the positioning convex portions 58B and 60B, respectively, formed on the lower housing 56B. Thus, the objective 52 and the ocular 54 are located and mounted at the predetermined positions in the lower housing 56B.

On this occasion, the objective 52 and the ocular 54 are mounted in the lower housing 56B so that the projections 52D and 54D, formed on the top surfaces of the flange portions 52B and 54B, are located above.

Then, the upper housing 56A is mounted on the lower housing 56B in which the objective 52 and the ocular 54 are mounted. At this time, the upper housing 56A is mounted on the lower housing 56B while fitting the positioning convex portions 52C and 54C, formed on the outer periphery of the flange portions 52A and 54A of the objective 52 and ocular 54, into the positioning concave portions 58A and 60A, respectively, formed in the opposite side of the inner peripheral portion of the upper housing 56A.

Once the upper housing 56A is mounted on the lower housing 56B, the projections 52D and 54D, formed on the top surfaces of the flange portions 52B and 54B, are fitted into the concave portions 62 and 64, respectively, formed in the top surface of the inner peripheral portion of the upper housing 56A.

Thus, the objective 52 and the ocular 54 are completely mounted in the finder housing 56. The objective 52 and ocular 54 mounted in the finder housing 56 are coaxially arranged with a predetermined spacing between them inside the finder housing 56. The diaphragm portion 66 integrally molded in the finder housing 56 is located between the objective 52 and the ocular 54.

The finder housing 56 in which the objective 52 and the ocular 54 are mounted is assembled in the camera main body 12 at a predetermined position.

Figure 8:
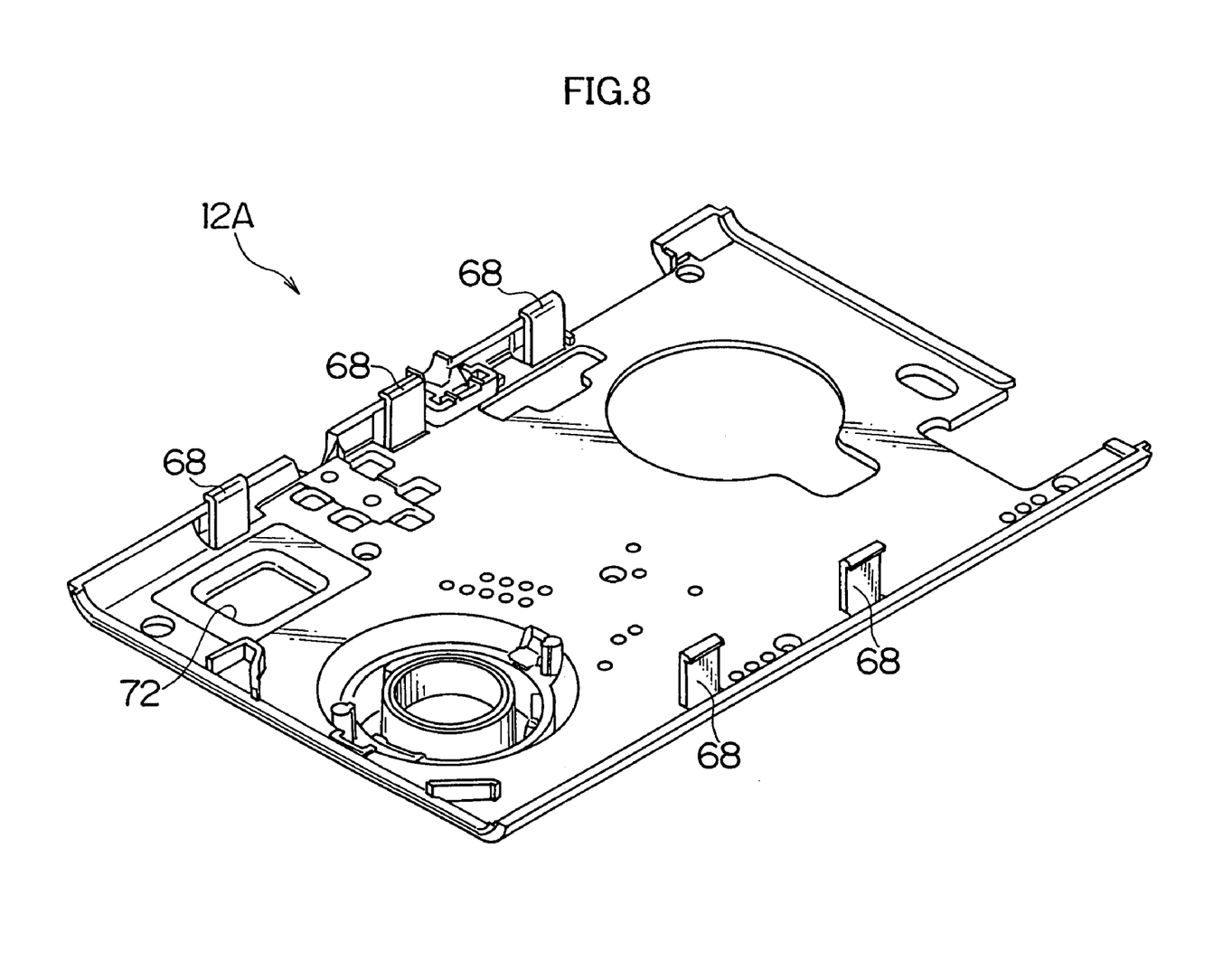
FIG. 8 is a perspective view showing the configuration of a front frame.
Figure 9:
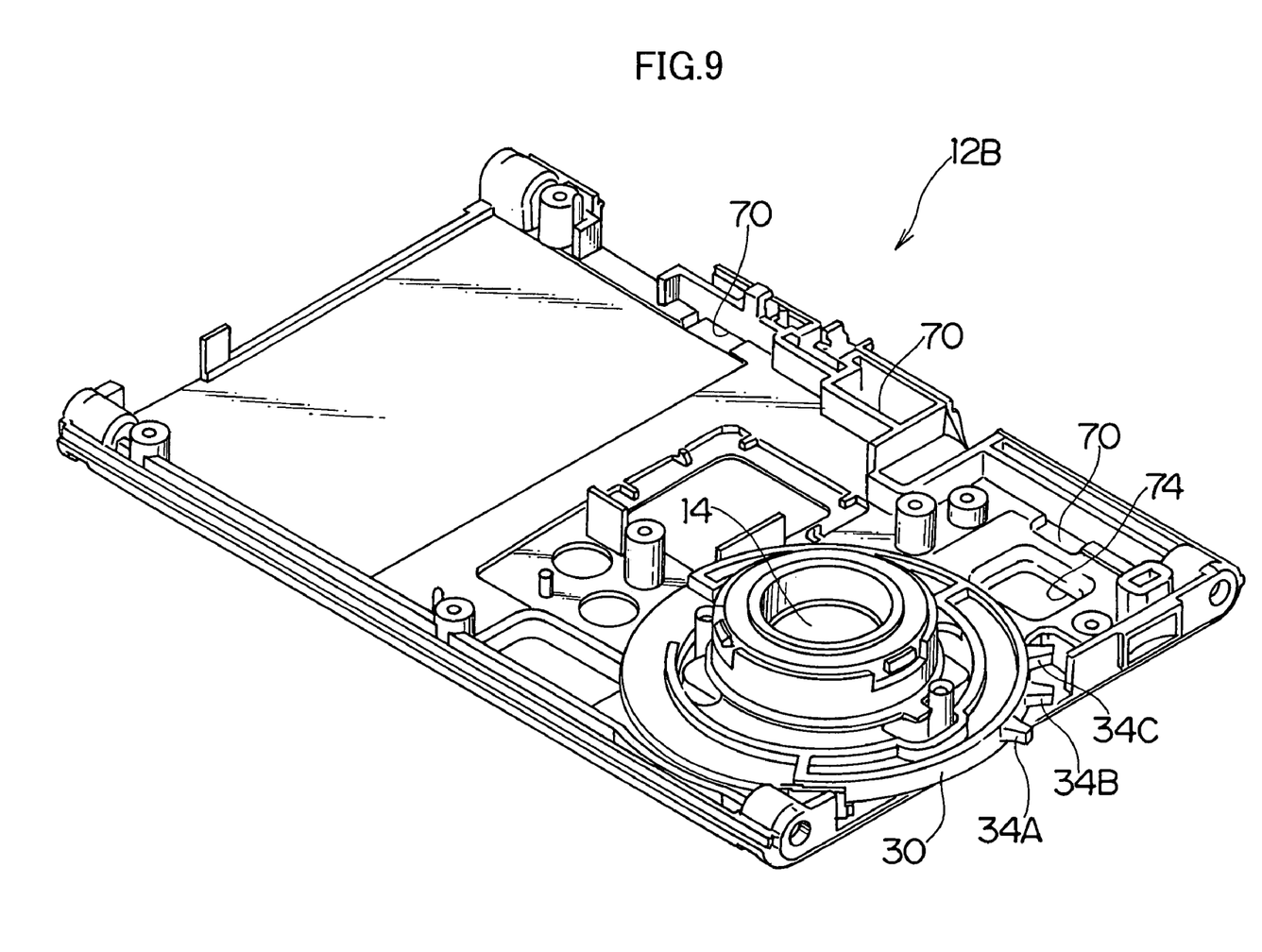
FIG. 9 is a perspective view showing the configuration of a rear frame.

The camera main body 12 is mainly composed of a front frame 12A and a rear frame 12B. The camera main body 12 is molded of a plastic material in a bright color, for example, bright gray. FIG. 8 is a perspective view showing the configuration of the front frame 12A. FIG. 9 is a perspective view showing the configuration of the rear frame 12B.

The front frame 12A and the rear frame 12B are integrated with each other in a superimposable manner by fitting engagement pawls 68 formed at three positions on an upper side portion and at two positions on a lower side portion of the front frame 12A, into engagement slots 70 formed at three positions on an upper side portion and at two positions on a lower side portion of the rear frame 12B (what is called a snap-in structure). FIG. 9 does not show the two engagement slots 70 on the lower side portion of the rear frame 12B.

Side frames 12R and 12L formed of a white plastic material are attached to the respective sides of the front frame 12A and rear frame 12B integrated together. The camera main body 12 is thus constructed.

A rectangular opening 72 constituting the finder window 16 is formed in the front frame 12A. The lens portion 52A of the objective 52 is fitted into the opening 72.

On the other hand, a rectangular opening 74 constituting the finder ocular portion 22 is formed in the rear frame 12B. The lens portion 54A of the ocular 54 is fitted into the opening 74.

Decorative plates 12a and 12b made of aluminum are mounted on the surfaces of front frame 12A and rear frame 12B, respectively, so as to coat the surfaces, as shown in FIG. 6.

To assemble the finder housing 56 in the camera main body 12, the lens portion 54A of the ocular 54 is first fitted into the opening 74, formed in the rear frame 12B. Thus, the finder housing 56 is positioned relative to the rear frame 12B. Then, the front frame 12A is attached to the rear frame 12B. Specifically, the engagement pawls 68, formed on the front frame 12A, are fitted into the corresponding engagement slots 70, formed in the rear frame 12B.

Once the front frame 12A is integrally attached to the rear frame 12B, the lens portion 52A of the objective 52 is fitted into the opening 72, formed in the front frame 12A. Thus, the finder housing 56 is completely assembled.

The finder housing 56 assembled in the camera main body 12 is fixed to the predetermined position in the camera main body 12 so that the end surface of the flange portion 52B of the objective 52 and the end surface of the flange portion 54B of the ocular 54 are sandwiched between the front frame 12A and the rear frame 12B.

According to the finder housing 56 according to the present embodiment configured as described above, the diaphragm portion 66 is integrally formed in the finder housing 56. Accordingly, even if light incident on the objective 52 is irregularly reflected by the outer peripheral surface of the objective 52, the irregularly reflected eye-hazardous light is blocked by the diaphragm portion 66. This enables the photographer to always view clear finder images.

The opening 66A in the diaphragm portion 66 preferably has the same size as that of the lens portion 54A of the ocular 54. This enables eye-hazardous light to be effectively eliminated without impairing the visual field of the finder.

Furthermore, by configuring the finder unit 50 separately from the camera main body 12 and forming the finder housing 56 using a plastic material in a dark color such as black, it is possible to effectively prevent light from the surroundings from entering the finder. This also enables the camera main body 12 to be formed of a plastic material in a bright color such as white. Therefore, the degree of freedom of camera designs is improved.

In the description of the present embodiment, the finder housing according to the present invention is applied to a card type digital camera. However, the application of the present invention is not limited to this aspect. The present invention is also applicable to silver cameras. In particular, the present invention is effective on recycled silver cameras.

What is claimed is:

1. A finder housing in which an objective that is a concave lens and an ocular that is a convex lens are arranged on an optical axis of an objective and an ocular with a predetermined spacing between an objective and an ocular, the finder housing being located at a predetermined position in a camera main body, the finder housing comprising:

a positioning concave portion formed like a frame surrounding said objective and ocular and having inner peripheral portions into which positioning convex portion formed on outer peripheries of a lens portion of said objective and a lens portion of said ocular is fitted; and a diaphragm portion which blocks reflected light from an outer peripheral surface of the objective and which is integrally formed between said objective and said ocular and which is formed so as to be dividable in a vertical or lateral direction.

2. The finder housing according to claim 1, wherein:

a flange portion is formed on an outer periphery of a rear end of the lens portion of said objective, and said positioning convex portion is formed on an outer periphery of the flange portion, a flange portion is formed on an outer periphery of a front end portion of the lens portion of said ocular, and said positioning convex portion is formed on an outer periphery of the flange portion, said camera main body comprises a front frame and a rear frame, and said finder housing is formed like a frame surrounding the outer peripheries of the flange portions of said objective and ocular, arranged with the predetermined spacing between them, and is located at the predetermined position in said camera main body by fitting the lens portion of said objective into an opening formed in said front frame and fitting the lens portion of said objective in an opening in the said rear frame.

3. The finder housing according to claim 1, wherein:

said camera main body is formed of a plastic material in a bright color, while said finder housing is formed of a plastic material in a dark color.

4. The finder housing according to claim 2, wherein:

said camera main body is formed of a plastic material in a bright color, and said finder housing is formed of a plastic material in a dark color.

5. The finder housing according to claim 1, wherein:

an opening in said diaphragm portion is formed to be as large as the lens portion of said ocular.

6. The finder housing according to claim 2, wherein:

an opening in said diaphragm portion is formed to be as large as the lens portion of said ocular.

7. The finder housing according to claim 3, wherein:

an opening in said diaphragm portion is formed to be as large as the lens portion of said ocular.

8. The finder housing according to claim 4, wherein:

an opening in said diaphragm portion is formed to be as large as the lens portion of said ocular.

* * * * *